(No Model.) 3 Sheets—Sheet 1.

J. S. TAYLOR.
SEED PLANTER AND FERTILIZER DISTRIBUTER.

No. 412,307. Patented Oct. 8, 1889.

Witnesses
Jos. S. Latimer

Inventor
John S. Taylor
By Soulé and Co.,
his Attorneys (No Model.) 3 Sheets—Sheet 3.

J. S. TAYLOR.
SEED PLANTER AND FERTILIZER DISTRIBUTER.

No. 412,307. Patented Oct. 8, 1889.

Witnesses

Inventor
John S. Taylor
by Soule and Lee,
his Attorneys

UNITED STATES PATENT OFFICE.

JOHN S. TAYLOR, OF BARTLE, INDIANA, ASSIGNOR OF ONE-HALF TO DENNIS GRAY, OF SAME PLACE.

SEED-PLANTER AND FERTILIZER-DISTRIBUTER.

SPECIFICATION forming part of Letters Patent No. 412,307, dated October 8, 1889.

Application filed May 10, 1888. Serial No. 273,426. (No model.)

*To all whom it may concern:*

Be it known that I, JOHN S. TAYLOR, of Bartle, in the county of Washington and State of Indiana, have invented certain new and useful Improvements in Seed-Planters and Fertilizer-Distributers, of which the following is a specification.

The general features of this invention are embodied in a machine which is adapted to plant two rows of seeds simultaneously, and hence there are two sets of compartments, each set of compartments comprising a receptacle for the seeds and a receptacle for the fertilizing material. These compartments are mounted on a suitable frame supported by wheels, which also supports the seat of the operator and the other mechanisms of the machine. The fertilizing material and the seed for each row are dropped simultaneously, and suitable mechanism is provided for insuring the deposit of the same at certain proper intervals, so that the seed is deposited in hills at given distances apart. The seed and fertilizing material pass from the compartments through conical funnels which lead close to the surface of the ground. These funnels, one of which is provided for each set of compartments, are carried by beams which are pivotally hung at the rear end of the machine, which extend beneath the machine, and at their front ends are yieldingly and adjustably secured, so that they may be independently operated upon by means of treadles to raise and lower the same. These beams also support devices similar to cultivator-teeth, for the purpose of opening furrows in the ground for the reception of the seed and fertilizing material, said teeth being located immediately in front of the conducting-funnels, and the beams also support elastic fingers in the rear of the funnels for covering the seed after it has been dropped.

The invention further comprises means for marking the ground immediately in line with the places where the seeds have been dropped, so as to indicate the positions of the hills and permit the succeeding rows of hills to be planted symmetrically therewith. Other novel details of the invention will be hereinafter more fully set forth.

The invention is illustrated in the accompanying drawings, in which—

Figure 1:
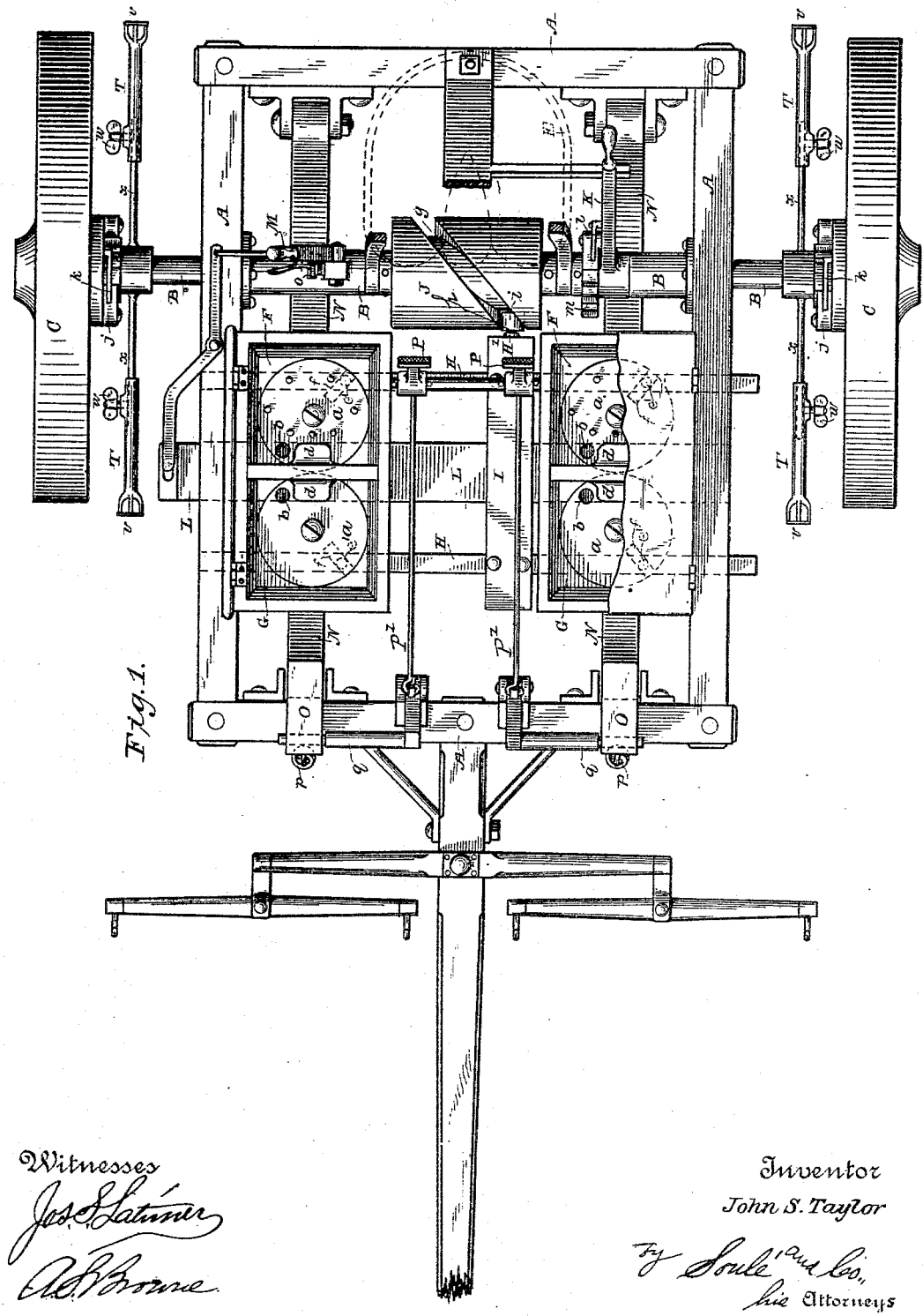
Figure 2:
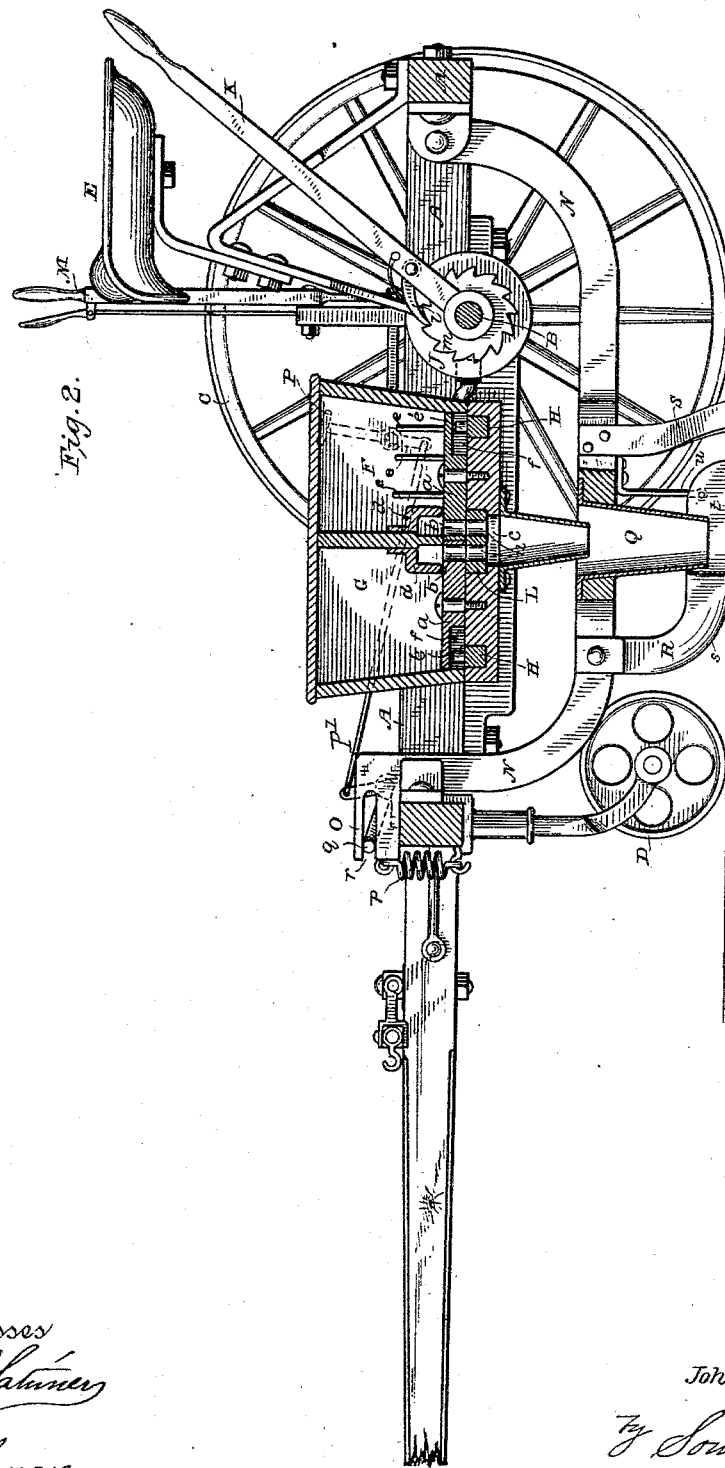
Figure 3:
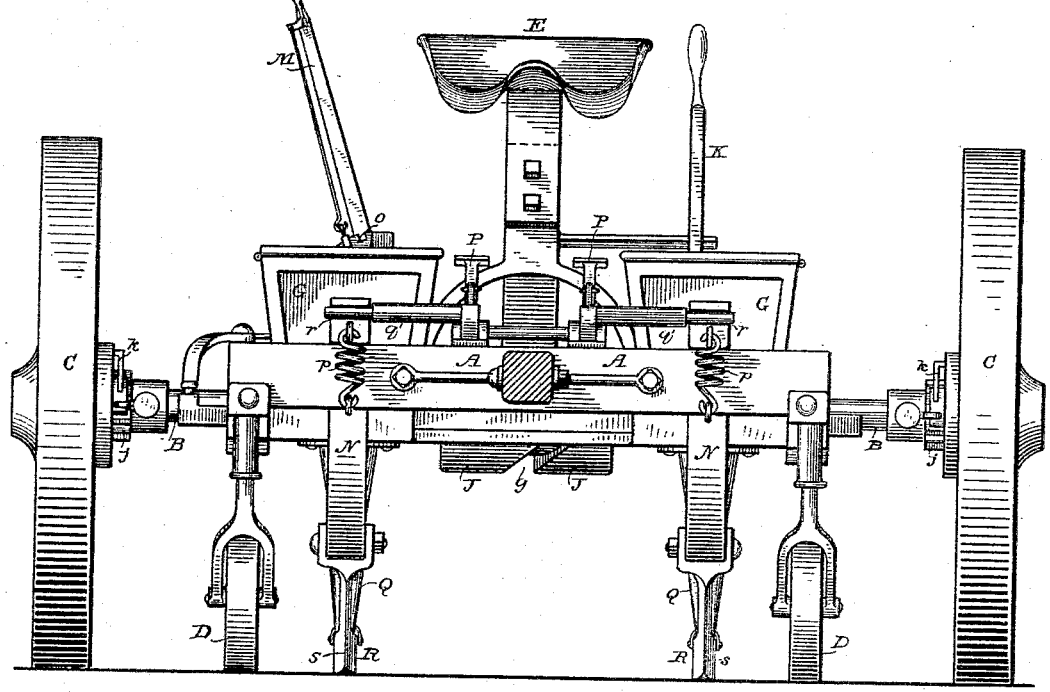
Figure 4:
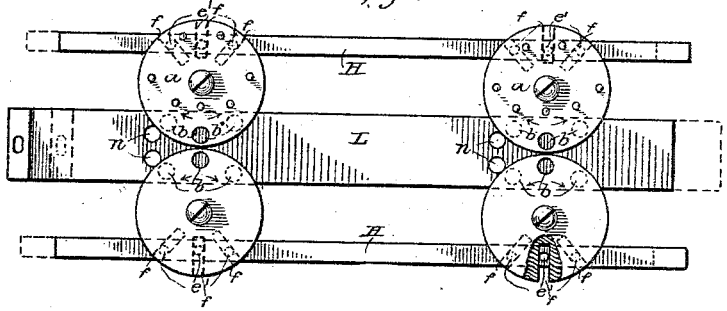
Figure 5:
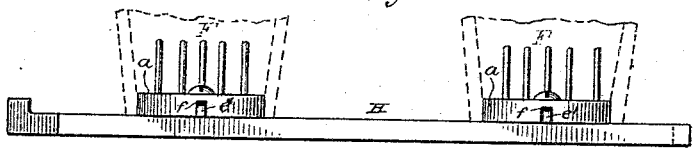

Figure 1 is a plan view of the machine. Fig. 2 is a central vertical longitudinal section of the machine. Fig. 3 is a front view. Figs. 4 and 5 are views of parts in detail.

A is a rectangular frame of any desired material, which is supported near its rear end upon an axle B, which carries the main drive-wheels C C. The frame is supported in front by one or two caster-wheels D D, and suitable poles or shafts are provided for the purpose of drawing the machine.

E is the driver's seat, which is supported by the axle and by the rear sill of the frame.

F F are the fertilizer-compartments, and G G are the seed-compartments, which are located in pairs, one near each side of the frame forward of the axle. Each compartment has at its bottom a circular plate $a$, which is journaled at its center, so as to oscillate in a horizontal plane. Near one edge each disk or plate $a$ has an aperture $b$ extending therethrough, which aperture is of the proper size to hold and retain the proper quantity of seed or fertilizing material to be deposited each time. Beneath the circular plates or disks $a$ an aperture or channel $c$ leads through the bottom support of each compartment, and through which the seed and fertilizing material from each set of compartments are conveyed downwardly on their way to the ground. Above each rotative or oscillating disk $a$, and immediately above the discharge-aperture $c$, is an overhanging shelf $d$, constituting a cut-off in each compartment, which projects far enough into the compartment to entirely cover the dropping-aperture $b$ in the oscillating disk $a$ when said aperture is brought beneath the shelf by the oscillation of the disk. In this manner the "pouring" of the seed or fertilizing material through the discharge-aperture is prevented, and only the measured quantity held within the aperture $b$ is discharged at each time. The disk in the fertilizer-compartment on each side is provided with upwardly-projecting pins $e$ $e$, which, being moved when the disk is oscillated, agitate the fertilizing material and keep the same in a pulverized condition. The disks are oscillated through a sufficient arc to bring the apertures $b$ clear from under the cut-offs $d$ on each side thereof, so that said apertures will fill and discharge twice during each oscillation of the disks.

The oscillation of the disks is effected in the following manner: Extending crosswise of the frame, immediately beneath the compartments, are two reciprocating sliding bars H H, one bar oscillating beneath the two fertilizer-compartments and the other bar oscillating beneath the two seed-compartments. Each bar has near opposite ends an upwardly-extending pin $e'$, which enters a slot $f$ in one of the disks $a$, being always retained therein. When the bars are reciprocated, they will oscillate the disks through the proper arc, which is determined by the extent of movement given to the bars. In order that the two bars may reciprocate together, they are connected by a cross-bar I, which is located in the open space between the two sets of compartments. The axle B, which is a rotary one, has rigidly attached to it at its center a drum J, which has in its periphery a cam-groove $g$. The connecting-bar I has on its end a pin $h$, which carries an anti-friction roller $i$, which is located and travels in said cam-groove, so that when the drum J is rotated the cam-groove will cause the bars H H to be reciprocated, thus oscillating the disks $a$. The frequency of the deposit of the seed will thus be determined by the diameter of the drive-wheels and the convolutions of the cam-groove.

In the arrangement of parts shown in the drawings the seed will be dropped twice to each complete revolution of the drive-wheels.

In order that the seed may not be deposited when the planter is moved backward, the drive-wheels are not rigidly mounted upon the axle, but are connected therewith by a ratchet-wheel $j$ and spring-pawls $k$ $k$, by means of which the wheels and axle are connected together, so that the axle will rotate with the wheels when the latter move forward, but not when they move backward. A hand-lever K is pivoted to the frame within convenient reach of the driver, and it co-operates by means of a pawl $l$ with a ratchet-wheel $m$, rigidly secured to the axle. The object of this lever is to insure the symmetrical planting of a field. When one double row has been planted and the machine is turned around to plant the next double row, it generally will not be in such position as to drop seed in hills in line with the hills previously planted. By means of the hand-lever K, however, the axle and grooved drum J can be rotated without the machine advancing so as to bring the first hills of the new rows in alignment with those of the preceding rows.

In order that the fertilizer and seed-dropping mechanisms may be rendered inoperative when so desired—as, for example, when driving to and from the field—a cut-off sliding bar L is arranged beneath the compartments having ports $n$ $n$ arranged therein, which are moved in and out of coincidence with the discharge-passage $c$ by the sliding of the bar L. The movement of the bar L is within the control of the driver by means of a spring-lever M, which is held in the positions to which it is moved by engagement with a rack $o$.

Beneath each set of compartments is a beam N, which is hinged at its rear end beneath the back sill of the frame, and which extends longitudinally forward to the front sill of the frame, where it is supported in a yielding and adjustable manner. Each beam has a horizontally-extending branch O, which extends above the front sill of the frame, and beneath this branch O and the front sill is interposed a coiled spring $p$, which normally holds the beam in its lowermost position, but permits its being raised when necessary or desirable. The forward end of each beam is raised by means of a treadle P, which is pivoted to the frame within convenient reach of the driver, and which is connected by a rod P' to a rock-shaft $q$, the outer arm of which is held and retained within a slot $r$ in the overhanging branch O of the beam. Each beam carries immediately beneath the discharge-passage $c$ a funnel Q, having its larger mouth directly beneath said discharge-passage and its smaller mouth a short distance above the surface of the ground. In front of said funnel the beam has fixed thereto a downwardly-extending furrow-opener R, having a sharp cutting-edge $s$ and two horizontally and rearwardly extending forks $t$ $t$, which embrace the lower end of the funnel. The rear ends of these forks are also supported from the beam by a rod $u$. Behind the funnel and the furrow-opener each beam has two downwardly-extending flexible covering-blades S S, which are suitably shaped at their lower ends to cover the furrow after the seed has been deposited.

In order to indicate the line of the hills wherein the seed has been deposited, the shaft carries on each side, between the frame and wheels, a number of hill-markers T T, corresponding in number with the number of hills planted at each revolution of the drive-wheels. In the machine shown there are two of these markers on each end of the axle. Each marker consists of an enlarged head $v$, which is adjustably secured so as to be moved to and from the axle by means of a set-screw $w$ to a radially-extending arm $x$, rigidly secured to a sleeve or collar on the axle. In this manner the depth to which the marker penetrates the soil may be determined. These markers will make visible depressions in the soil in line with each two hills which have been deposited, so that when the two adjacent rows are to be planted the driver can so start the machine that the rows of hills will be symmetrically planted throughout the entire field.

I claim as my invention—

In a seed-planter and fertilizer-distributer, a supporting-frame, drive-wheels supporting said frame, and two sets of seed and fertilizer compartments supported on each side of said frame, the planting mechanism of which is actuated by a cam on the axle of said drive-wheels, in combination with two beams N N, each pivoted at one end to the rear of said frame, passing beneath one set of said compartments and above and out of contact with the ground, and adjustably and yieldingly supported at its front end at the front of said frame, independent treadles P P, for controlling the adjustment of each of said beams, a guiding-funnel Q, carried by each of said beams beneath the discharge-passage leading from the set of compartments above it for conducting the seed to the ground, a furrow-opener R, carried by each beam in front of said funnel, and a hill-coverer S, carried by each beam in the rear of said funnel, substantially as set forth.

In witness whereof I have hereunto signed my name in the presence of two subscribing witnesses.

JOHN S. TAYLOR.

Witnesses:
REUBEN L. BARTLE,
OTTO F. GRAY.